United States Patent
Kahkoska

(10) Patent No.: US 7,266,455 B2
(45) Date of Patent: Sep. 4, 2007

(54) APPARATUS FOR LOW COST LIGHTNING DETECTION

(75) Inventor: James Anthony Kahkoska, Colorado Springs, CO (US)

(73) Assignee: Outdoors Technologies, Inc., Colorado Springs, CO (US)

( * ) Notice: Subject to any disclaimer, the term of this patent is extended or adjusted under 35 U.S.C. 154(b) by 0 days.

(21) Appl. No.: 11/373,049

(22) Filed: Mar. 10, 2006

(65) Prior Publication Data

US 2006/0206268 A1    Sep. 14, 2006

Related U.S. Application Data

(60) Provisional application No. 60/659,929, filed on Mar. 10, 2005.

(51) Int. Cl.
   *G01W 1/00* (2006.01)
   *G06F 11/30* (2006.01)

(52) U.S. Cl. .......................................... 702/4; 702/182

(58) Field of Classification Search .................. 702/1, 702/3, 4, 182; 340/600, 601; 73/170.24; 342/432, 462

See application file for complete search history.

(56) References Cited

U.S. PATENT DOCUMENTS

| | | | |
|---|---|---|---|
| 3,715,660 A | | 2/1973 | Ruhnke ........................ 324/72 |
| 4,023,408 A | | 5/1977 | Ryan et al. ................ 73/170 R |
| 4,803,421 A | * | 2/1989 | Ostrander .................... 324/72 |
| 5,295,072 A | * | 3/1994 | Stevens et al. ................ 702/4 |

* cited by examiner

*Primary Examiner*—Bryan Bui
(74) *Attorney, Agent, or Firm*—patenttm.us; James H. Walters

(57) ABSTRACT

A lightning detector system monitors the lightning strikes requires a real-time detection and processing system. A real-time processing system requires the use of a high-speed processor with floating-point math capability and multiple analog to digital channels. The cost, power and size requirements of such a system make it difficult to develop a low cost, pocket size lightning detector with long battery life. This invention provides a method of detecting and ranging lightning strikes using an inexpensive eight-bit processor with a single A/D channel and without floating point hardware.

21 Claims, 3 Drawing Sheets

APPARATUS FOR LOW COST LIGHTNING DETECTION

This application claims priority of U.S. provisional patent application Ser. No. 60/659,929, filed Mar. 10, 2005.

BACKGROUND OF THE INVENTION

This invention relates to the low cost detection of lightning. Most lightning detectors detect the electromagnetic field of the return stroke of a cloud to ground strike and indicate the approximate distance to the strike. Previous developments in the field of lightning detection include ranging systems that display the distance to lighting strikes (U.S. Pat. No. 3,715,660 Ruhnke) and devices that use CRTs to display the azimuth and distance from the user (U.S. Pat. No. 4,023,408, Ryan et al).

The use of 2 perpendicular, horizontal coils for detecting the electromagnetic signal of lightning strikes is common practice. This allows one antenna to detect north-south (NS) strikes and the other to detect east west (EW) strikes. To determine the strength of a strike that is not perfectly perpendicular to the coils requires a summing operation with both components. This summing operation must happen very quickly so that the return stroke leading edge of lightning strike can be recognized and to trigger subsequent data acquisition. Some practical problems arise when aggregating the two channels. To create a low cost system, a processor without advanced hardware floating point math capability must be employed. This results in the use of floating point libraries when summing operations, such as the square root of the sum of the squares require a much longer time periods than required by a real time lighting detection system. Additionally, the power consumption of more complex processors capable of performing the summing operation would lessen the battery life of a portable, low cost product.

SUMMARY OF THE INVENTION

In accordance with the invention, an apparatus for low cost lightning detection employs an apparatus for quickly determining the strength of fast lookup scheme for quickly determining the strength of a strike at any orientation from the detector and its 2 orthogonal antennas.

Accordingly, it is an object of the present invention to provide an improved method of determining the strength of a strike independent of its orientation relative the antennas.

It is a further object of the present invention to provide an improved method that allows a lower cost and lower power processor to be used for the detection of lightning.

Accordingly, the object of the invention relates to a lightning detector system that monitors the lightning strike information in real time using a low cost microprocessor that has a single analog to digital channel and no hardware floating point math capability. The advantage of this invention is it allows a small, low cost lightning detector to be developed with long battery operation. Long battery operation allows a smaller unit with a lower operating cost.

The square root of the sum of the squares is the technique used to determine the total magnitude of the NS and EW components (FIG. 1). For example, both antennas would detect a strike at 45 degrees with equal amplitude. By taking the square root of the sum of the NS magnitude squared and EW magnitude squared the true strength of the signal is accurately measured.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises 2 orthogonal antennas, signal amplification, an 8 bit A/D converter, a lookup table with 256 entries, and the ability to form an index into the lookup table.

Figure 1:
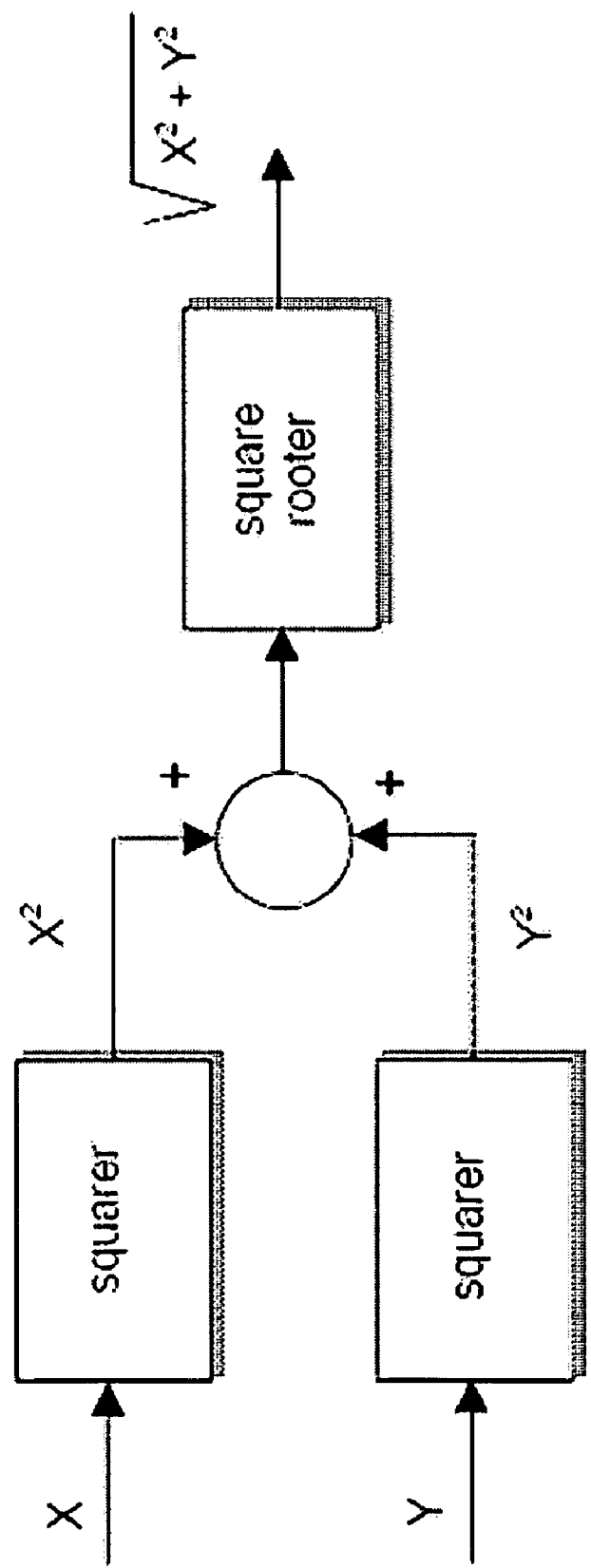
FIG. 1 is a block diagram of the square root of the sum of the squares operation employed for aggregating the two orientations.
Figure 2:
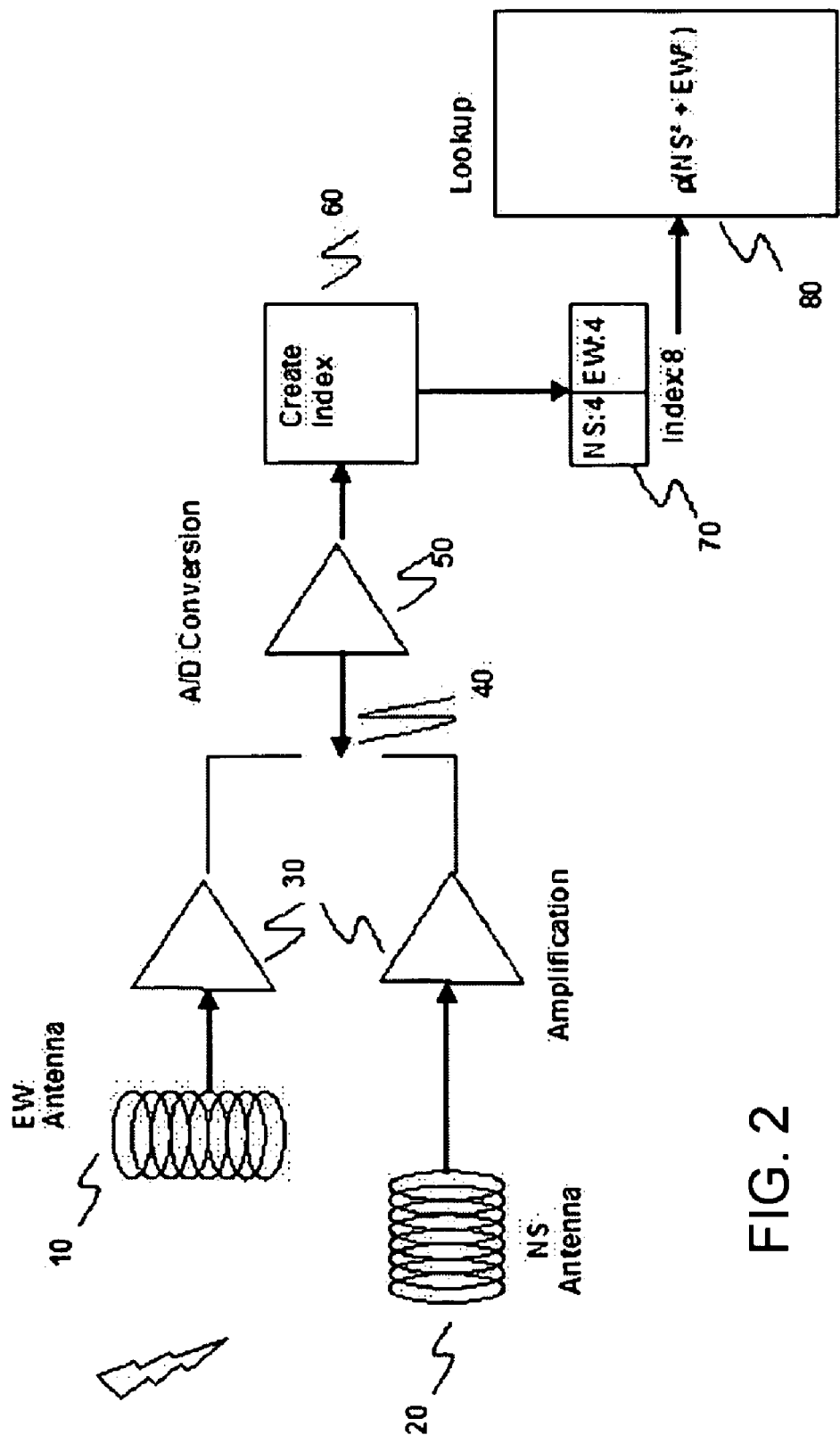
FIG. 2 is a block diagram of the preferred embodiment.

Referring to FIG. 2, a block diagram that illustrates the preferred embodiment, antennas 10 (EW, east-west) & 20 (NS, north-south) are oriented horizontal and perpendicular to each other. Signal amplification is provided by amplifiers 30. The signal, NS or EW, to be measured is switched into the A/D converter 50 by switch 40, which alternately connects to either the NS or the EW amplifier output. In operation, as soon as one side, NS or EW is sampled, the other side is sampled thereafter. The results of the conversion are used to create an index 60 into a pre-computed lookup table 80. The table is created in advance on a more powerful computer by computing the resultant strength for combinations of individual orientation strengths.

The index creation is accomplished by forming an index whose maximum value represents the largest table size allowed by the processor. In the illustrated embodiment the maximum table size is 256 entries. This means an 8 bit index must be formed. The four most significant bits of both channels (NS and EW) are concatenated to form the index. The index 70 corresponds to a table value 80, which is the pre-computed magnitude as defined by the square root of the sum of the squares.

Figure 3:
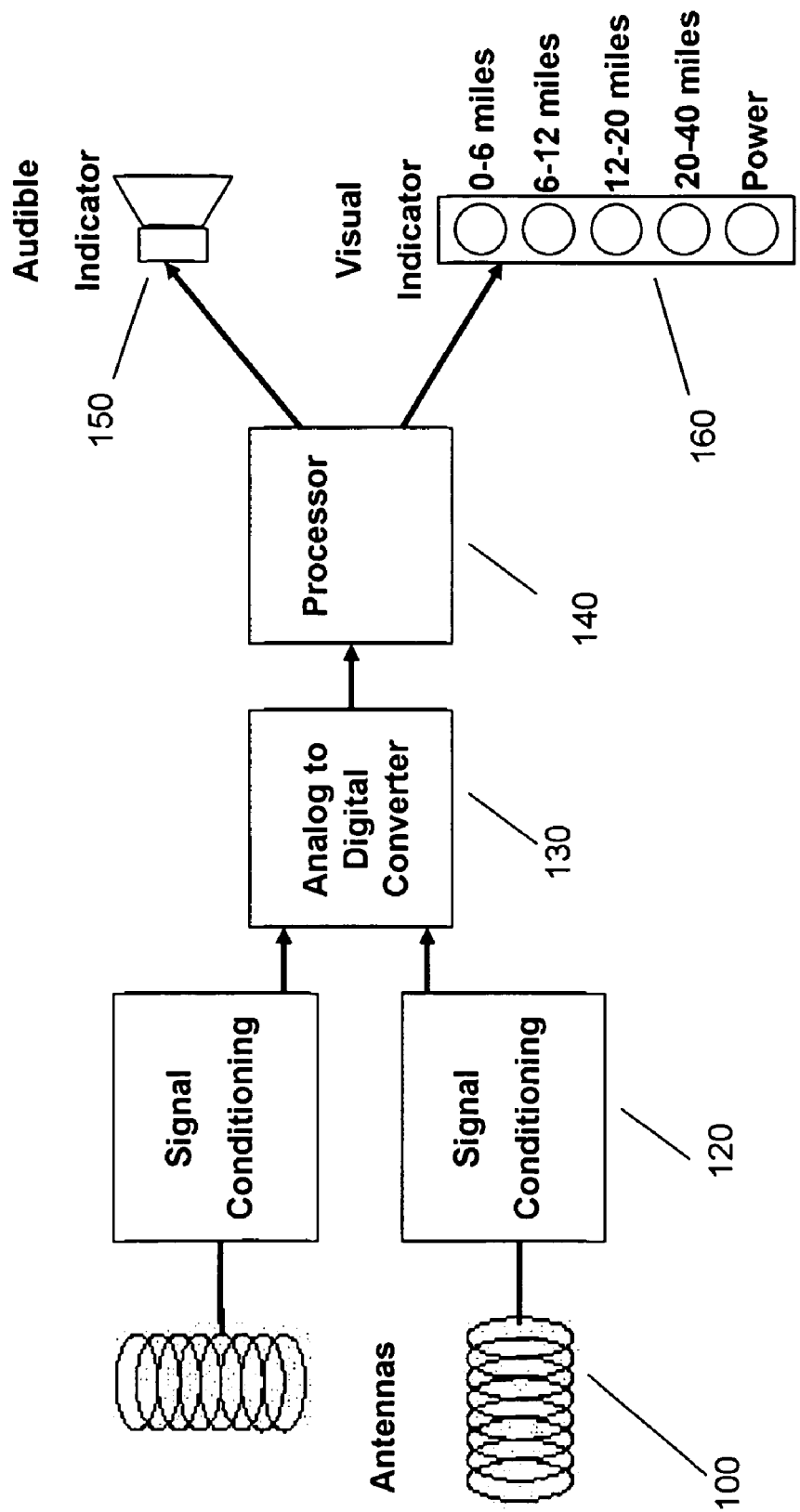
FIG. 3 is a block diagram of a lightning detector embodying the invention, with audible and visual indicators.

Referring to FIG. 3, a block diagram of a low cost lightning detector embodying the invention, the detector comprises two horizontal and perpendicular antennas 100 with appropriate signal conditioning blocks 120 to provide a suitable signal for analog to digital conversion by A to D converter 130. The absolute signal strength of a lightning strike is computed by the processor 140 by use of the lookup table method and apparatus discussed above, operation of which is implemented by processor 140. The processor suitably has the ability to provide audible indication of lightning strikes by operation of speaker 150, and/or visual indication by operation of indicators 160, to report a new lighting strike and relative distance from the device (determined based on signal strength of the detected strike). In a particular embodiment, visual indicators are provided to show power (i.e., that the unit is powered on and operating), and distance of a recent detected strike from the unit, for example, in ranges of 0-6 miles, 6-12 miles, 12-20 miles and 20-40 miles. The indicators are suitable light emitting diodes (LEDs). Operation of the unit and observation of the indicators over time can thereby provide information as to distance and direction (heading towards or away from the user) of lighting strikes.

The overall operation of the device, including the timing and operation of measurements, is controlled by processor 140.

A power switch (not illustrated) in the preferred embodiment provides 3 options, off, on, on with audible indicator.

In operation, when the device is first powered on, the processor performs a battery test. The LEDs will indicate the battery level, with each LED indicating approximately 20 hours of operation, for example. During normal operation, one LED, e.g. Power, which is suitable a green LED, will be on continuously to indicate that the device is monitoring for lightning strikes. If the LED is blinking, it can indicate that the device is in the presence of interference (such as from nearby CRTs, motors, engines or high-power electronic equipment).

When a lightning strike is detected, the device lights the appropriate LED indicating the distance of the strike. In a particular embodiment, this LED will remain lit for two minutes, unless another strike occurs during that time. If a more recent strike is further away, the LED indicating this distance will light for two seconds, and then the device returns to complete the two minute indication of the nearest strike. If a more recent strike is nearer, it will replace the previous LED reading. This LED indicator will be held for two minutes. This operation allows the user to see all the lightning activity within a 40 mile range, giving clearer visibility to the nearest strike in the last two minutes. If the power switch is in the "On with Tone" position, the device will also generate tone(s) indicating the distance of the strike along with lighting the appropriate LED, enabling determination of the storm's activity without having to monitor the LEDs.

The device also can indicate storm direction, employing strike distances over the last five minutes to determine if a storm is approaching or departing. By depressing the power switch, the LED will change to one of three patterns:

If the LED cycles from green to red, the storm is approaching.

If the LED cycles from red to green, the storm is departing.

If the LED cycles from the center LED to the outside LEDs, the storm is stationary or there is not enough data to determine the direction of the storm. Direction cannot be determined if there has not been enough strikes to identify a trend or if the device has not been running long enough. Approximately five minutes is typically the amount of data needed to provide a meaningful direction indication.

Thus, in accordance with the invention, a low cost lighting detection system is provided, adapted for implementation as a portable low power battery operated device. The device is suitably provided as a pocket size or hand held size device, such as the size of a pager.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A lightning detection system comprising:
   a first and second antenna, arranged orthogonally to one another for receiving a signal generated by a cloud to ground lightning strike; and
   a processing system having as an input said received signal from said first and second antennas and adapted for detecting a leading edge of the received signal generated by a cloud to ground lightning strike using a fast aggregation of signals from said first and second antennas to produce an index for selecting a value from a lookup table having values therein representative of possible signal values.

2. A lightning detection system according to claim 1, wherein said processing system further comprising:
   a signal conditioner system adapted to condition the received signals from said antennas; and
   an analog to digital converter receiving the conditioned signals from said signal conditioner and generating digital values based thereon.

3. A lightning detection system comprising:
   a first and second antenna, arranged orthogonally to one another for receiving a signal generated by a cloud to ground lightning strike; and
   a processing system having as an input said received signal from said first and second antennas and adapted for detecting a leading edge of the detected signal generated by a cloud to ground lightning strike using a fast aggregation of signals from said first and second antennas,
   wherein said fast aggregation comprises:
   a pre-computed table of resultant strengths for various strike orientations relative to the antennas; and
   an algorithm for forming an index into the table.

4. A lightning detection system according to claim 3, wherein the algorithm for creating a distinct index into the pre-computed table is the result of concatenating the individual strengths of each antenna signal.

5. A lightning detection system comprising:
   a first and second antenna, arranged orthogonally to one another for receiving a signal generated by a cloud to ground lightning strike; and
   a processing system having as an input said received signal from said first and second antennas and adapted for detecting a leading edge of the detected signal generated by a cloud to ground lightning strike using a fast aggregation of signals from said first and second antennas,
   wherein said processing system further comprising:
   a signal conditioner system adapted to condition the received signals from said antennas; and
   an analog to digital converter receiving the conditioned signals from said signal conditioner and generating digital values based thereon, and
   wherein said processor employs said digital values to create an index into a table of resultant lightning strength values for plural strike orientations relative to the antennas.

6. A lightning detection system according to claim 5, wherein said index comprises a concatenation of the individual strengths of each antenna signal.

7. A method of providing lightning detection, comprising:
   providing first and second antennas, arranged orthogonally to one another for receiving a signal generated by a cloud to ground lightning strike;
   providing a processing system having an input of said received signal from the first and second antennas, said processing system detecting the leading edge of a cloud to ground lightning strike using a fast aggregation of signals from said first and second antennas to produce an index for selecting a value from a lookup table having values therein representative of possible signal values; and indicating said detecting.

8. A method of providing lightning detection, comprising:

providing first and second antennas, arranged orthogonally to one another for receiving a signal generated by a cloud to ground lightning strike;

providing a processing system having an input of said received signal from the first and second antennas, said processing system detecting the leading edge of a cloud to ground lightning strike using a fast aggregation of signals from said first and second antennas;

providing a pre-computed table of resultant strengths for various strike orientations relative to the antennas;

forming an index into the table based on the detected lightning strike; and indicating said detecting.

9. The method according to claim 8, wherein said method further comprises:

reading the resultant strength from the table based on said index.

10. The method according to claim 9, wherein said indicating further comprises:

providing an indication of lightening strike based on said resultant strength.

11. The method according to claim 10, wherein said indication is an audible indication.

12. The method according to claim 10, wherein said indication is a visual indication.

13. The method according to claim 12, wherein said visual indication comprises indication of relative distance of the detected lightening strike from the antennas.

14. The method according to claim 13, wherein said indication of relative distance comprises lighting at least one of plural indicators.

15. The method according to claim 8, wherein said forming an index into the table based on the detected lightning strike comprises concatenating the individual strengths of each antenna signal to provide the index.

16. A portable lightning detection device, comprising:

first and second antennas, oriented orthogonally to one another;

a signal conditioner for conditioning the signals received from said antennas;

an analog to digital converter receiving the conditioned signals from said antennas, for converting the conditioned signals to digital values;

a lookup table storing plural values of resultant strengths for plural lightning strike orientations;

a processor for producing an index by concatenating one of a digital value produced from a signal from said first antenna and a corresponding one of a digital value produced from a signal from said second antenna, said processor employing said index to select a value from said lookup table; and an indicator to provide a lightning strike indication based on said selected value from said lookup table.

17. A portable lightning detection device according to claim 16, wherein said indicator comprises an audio indicator.

18. A portable lightning detection device according to claim 16, wherein said visual indicator comprises plural lightable elements representing relative distance of a lightning strike from said antennas.

19. A portable lightning detection device according to claim 16, wherein said indicator comprises a visual indicator.

20. A portable lightning detection device according to claim 19, wherein said visual indicator comprises at least one LED.

21. A portable lightning detection device according to claim 19, wherein said visual indicator comprises plural lightable elements representing relative signal strength.

* * * * *